Patented Nov. 22, 1932

1,888,935

UNITED STATES PATENT OFFICE

ADOLPH PLAČEK, OF NEW ORLEANS, LOUISIANA

PROCESS OF PRODUCING ETHYL ALCOHOL FROM WOOD OR OTHER CELLULOSE CONTAINING MATERIALS

No Drawing. Application filed January 28, 1929. Serial No. 335,757.

This invention relates to a new process, by which wood waste or other cellulose containing materials, in the form of sawdust or in other suitable disintegrated forms, are saccharified by means of strong mineral acids, and the extracted liquid therefrom is mixed with molasses or other parent materials in such proportions as to obtain a wort, which can be successfully fermented and, subsequently, distilled in order to produce ethyl alcohol.

It is known, that wood or many other cellulosic materials can be transformed into fermentible sugars, through hydrolysis, by means of dilute or concentrated strong mineral acids, like sulphuric, hydrochloric, or phosporic acids. Heretofore, the saccharified wood has been extracted with water, and the acid saccharine solution, before subjecting it to a fermentation process, has been neutralized with lime or calcium carbonate. This operation, however, involves, besides the cost of neutralizing material, a complete waste of the acid, used for the saccharification of wood. The recovery of this acid from the products of saccharification has always presented a serious technical problem.

In my process, the wood or other cellulosic materials are saccharified by one of the known methods, by means of sulphuric acid or other mineral acids which are capable of hydrolyzing the material and of liberating organic acids from the organic salts in the molasses and the like. The free acid, contained in the saccharine extraction liquid from wood, instead being neutralized and thus destined for waste, is used for the acidification of molasses, be it cane-sugar, or beet-sugar molasses, or other parent sugar materials destined for fermentation, by preparing a mixture of the saccharine extraction liquid from the saccharified wood or other cellulosic materials and of the molasses in such a proportion as to create such an acidity of the resulting mixed wort, which is suitable to the strain of yeast employed in the subsequent fermentation.

Heretofore, the molasses, intended for the production of ethyl alcohol by fermentation, has been diluted with water, and acidified by a certain amount of mineral acid required for the proper function of the yeast.

In my process this necessary quantity of acid is furnished by mixing the molasses with the acid liquid made by the saccharification and subsequent extraction of wood. Thus the cost of the acid necessary in the fermentation of molasses is eliminated. Then the cost involved in using the neutralizing material, besides the expensive operation and necessary equipment, when the wood saccharine products alone are used for the production of ethyl alcohol, are also eliminated. Furthermore, I found, that the sum of the amounts of ethyl alcohol produced by fermentation separately from the extract of saccharified wood and from the molasses solution (brought to the optimum acidity) was practically the same as when I made ferment a mixed wort prepared from both the neutralized extraction of saccharified wood and from the molasses (brought to the optimum acidity).

Besides the reduced expenses for sulphuric or other employed acid, and for neutralizing materials, my process has the following advantages: The use of nutrient salts (like ammonium sulphate and others), necessary only in the fermentation of saccharine worts from the wood, is largely reduced, because the admixture of molasses into the fermentation wort usually brings sufficient food for the proper development of the yeast and for the completion of fermentation. Furthermore, the economic disposal of the distillery slops on one hand, and of the extracted hydrolized wood on the other hand, is greatly facilitated, namely, when the method is used by which the mixture of concentrated slops with the treated sawdust is dried, and used as a solid fuel, or subjected to a destructive distillation process in view to produce charcoal and many other valuable by-products.

My process may be made more comprehensive by the following example: Wood sawdust is saccharified by means of dilute sulphuric acid, using the specifications recommended by the U. S. Forest Product Laboratories as follows: 100 parts of wood sawdust are mixed with 200 parts of water containing 2.5 parts of 100% sulphuric acid. This mixture is subjected to a pressure of 115 lbs. per sq. in. for 15–20 minutes by means of live steam in the digesters. The digested wood is then leached with water until all sugar and acid are practically extracted. The distillery slops may be advantageously employed in the last stages of extraction. The resulting weak acid sugar solution is mixed with the cane-sugar molasses in such a proportion as to bring the density and the total acidity of the resulting wort to the appropriate condition. This, however, depends on the kinds of molasses and of wood used. For example: a long-leaf pine sawdust and a Cuban can sugar molasses, containing about 52% of total invert sugar, were used respectively in the process. Very good results were obtained when the saccharine extract, corresponding to 350 grams of wood, which was saccharified by the above mentioned method, using 5 c.c. of 95% sulphuric acid, was mixed with 1000 grams of molasses, and the mixture brought to a total volume of 5000 c.c. The wort thus obtained is fermented by yeast and then distilled.

Beet-sugar molasses generally requires more acid, and consequently, less molasses must be used than in the previous example, unless other methods of wood saccharification are employed, in which proportionately more acid in saccharification of the cellulosic materials is used, or additional dose of acid is added to the wort to be fermented.

Having now described my invention, I claim:

1. A process of manufacturing alcohol which comprises saccharifying cellulose material with an excess of a strong mineral acid capable of hydrolyzing the material and of liberating organic acids from the organic salts in molasses, mixing the liquor with molasses containing fermentable sugar in proportion to partly neutralize the excess of acid and to obtain an optimum acidity, and fermenting the mixture with yeast.

2. A process of manufacturing alcohol which comprises saccharifying cellulose material with an excess of a strong mineral acid capable of hydrolyzing the material and of liberating organic acids from the organic salts in materials containing fermentable sugars and obtained in manufacture of sugars, mixing the liquor with such material in proportion to partly neutralize the excess of acid and to obtain an optimum acidity, and fermenting the mixture with yeast.

ADOLPH PLAČEK.